US011940017B2

United States Patent
Schmidt

(10) Patent No.: US 11,940,017 B2
(45) Date of Patent: Mar. 26, 2024

(54) ELECTRORHEOLOGICAL BRAKE

(71) Applicant: Safran Landing Systems Canada Inc., Ajax (CA)

(72) Inventor: Robert Kyle Schmidt, Brooklin (CA)

(73) Assignee: Safran Landing Systems Canada Inc., Ajax (CA)

( * ) Notice: Subject to any disclaimer, the term of this patent is extended or adjusted under 35 U.S.C. 154(b) by 9 days.

(21) Appl. No.: 17/682,592

(22) Filed: Feb. 28, 2022

(65) Prior Publication Data

US 2023/0272826 A1     Aug. 31, 2023

(51) Int. Cl.

| F16D 27/115 | (2006.01) |
| B64C 25/42 | (2006.01) |
| F16D 55/00 | (2006.01) |
| F16D 55/32 | (2006.01) |
| F16D 55/40 | (2006.01) |
| F16D 65/02 | (2006.01) |

(52) U.S. Cl.
CPC ............ *F16D 27/115* (2013.01); *F16D 55/32* (2013.01); *F16D 55/40* (2013.01); *B64C 25/42* (2013.01); *F16D 2055/005* (2013.01); *F16D 2065/138* (2013.01)

(58) Field of Classification Search
CPC ........ F16D 27/115; F16D 55/28; F16D 55/32; F16D 55/40; F16D 57/002; F16D 2055/005; F16D 2065/128; F16D 2121/02; F16D 2123/00; F16D 2121/20; B64C 25/42; Y10S 482/903
USPC ........................ 188/18 A, 72.1, 161
See application file for complete search history.

(56) References Cited

U.S. PATENT DOCUMENTS

| 1,061,142 | A |   | 5/1913 | Tesla | |
| 2,955,682 | A | * | 10/1960 | Heck | F16D 65/853 |
| | | | | | 188/71.6 |
| 8,839,918 | B2 |   | 9/2014 | Thibault et al. | |
| 2002/0074196 | A1 | * | 6/2002 | Park | F16D 57/002 |
| | | | | | 188/267.2 |
| 2002/0108817 | A1 | * | 8/2002 | Sieber | F16D 55/28 |
| | | | | | 188/72.1 |
| 2015/0136541 | A1 | * | 5/2015 | Han | F16D 57/002 |
| | | | | | 188/161 |
| 2020/0049217 | A1 | * | 2/2020 | Bai | F16D 67/06 |
| 2021/0229799 | A1 | * | 7/2021 | Veilleux, Jr | B64C 25/44 |

FOREIGN PATENT DOCUMENTS

| CN | 102401046 | A | * | 4/2012 | |
| CN | 203189572 | U | * | 9/2013 | |
| CN | 112673188 | A | * | 4/2021 | ............. B60K 25/02 |
| EP | 3 858 685 | A1 |   | 8/2021 | |

OTHER PUBLICATIONS

English translation of CN-112673188-A, Apr. 2021.*

* cited by examiner

*Primary Examiner* — Robert A. Siconolfi
*Assistant Examiner* — San M Aung
(74) *Attorney, Agent, or Firm* — CHRISTENSEN O'CONNOR JOHNSON KINDNESS PLLC

(57) ABSTRACT

A brake assembly is suitable for use with a vehicle wheel that has a rim rotatably mounted to an axle. The brake assembly includes a housing fixedly positioned relative to the axle and a plurality of disks disposed within the housing and fixedly positioned relative to the rim. A fluid is disposed within the housing and has a selectively variable viscosity. The viscosity of the fluid is selectively increased to increase a braking force applied to the wheel.

14 Claims, 7 Drawing Sheets

ELECTRORHEOLOGICAL BRAKE

BACKGROUND

Traditional vehicle brakes are frictional retarding devices that work by pressing a moving component against a stationary component. FIGS. 1 and 2 show a landing gear assembly 20 with a known brake assembly 60 suitable for a vehicle, such as an aircraft or a maglev vehicle. As shown in FIG. 1, the landing gear assembly 20 includes a strut 30 and an axle 50. One end of the strut 30 is coupled to the vehicle (not shown), and the other end of the strut is coupled to the axle 50. In the illustrated embodiment, the axle 50 extends laterally outward from the strut 30 and has a wheel 40 rotatably mounted to each end.

Referring now to FIG. 2, a portion of one of the wheels 40 and the associated brake assembly 60 is shown. The wheel 40 includes a pneumatic tire 42 mounted to a rim 44. The rim 44 is mounted to the axle 50 by a plurality of bearings 46 so that the wheel 40 is rotatable about the centerline 300 of the axle.

The brake assembly 60 is disclosed in U.S. Pat. No. 8,839,918, issued to Thibault et al., ("Thibault") and currently assigned to Safran Landing Systems, the disclosure of which is incorporated by reference herein. The illustrated brake assembly 60 is a multi-disc brake assembly that includes an annular bracket 70 fixedly coupled to the axle 50 and is configured to provide mounting interfaces for brake components that remain fixedly positioned relative to the axle 50. A stack 64 of discs includes a series of alternating rotors 66 and stators 68. Each of the rotors 66 is keyed to the rim 44 of the wheel 40 so that the rotors rotate in unison with the wheel. Each of the stators 68 is keyed to the axle 50 and remains rotationally fixed relative to the axle. Thus, when the wheels 40 rotate, e.g., when the vehicle is supported by the landing gear assembly 20 and the vehicle is in motion, the rotors 66 rotate with the wheels relative to the stators 68.

A plurality of actuators 62 are mounted to the bracket 70 and are spaced circumferentially around the axle 32. The actuators 62 are linear actuators that selectively extend and retract in unison. Extension of the actuators 62 clamps the stack 64 between the actuators and a torque plate 72 mounted to or integrally formed with the bracket 70 opposite the actuators. As the actuators 62 compress the stack 64, adjacent stators 68 and rotors 66 engage each other. With the stack 64 compressed and the rotors 66 rotating with the wheels 24, friction between the rotors 66 and the stators 68 generate a resistive braking force that is reacted to the wheels through the stators. When the actuator is retracted, the rotors 66 and stators 68 disengage from each other, and the restive braking force ceases.

The frictional nature of the illustrated brake assembly and others like it results in several inherent disadvantages. Also, the energy cost of making the brake materials, only to have them wear out, is very high. Friction material particles are shed into the atmosphere, generating a source of pollution. Further, there is an upper limit to the amount of heat which can be stored in each brake (a given wheel has only so much volume, and the heat must be stored in material placed in that volume). In some environments, such as partial vacuum, the frictional characteristics of the brake material can be altered (for instance, carbon brakes are dependent on some atmospheric humidity in order to optimize their wear rates).

With respect to maglev vehicles, materials developed for use in conventional braking systems are generally designed for use in standard atmospheric operating conditions. Utilizing these materials in a low-pressure braking environment can affect performance and operational lifetime of a braking system. Further, known braking systems, such as those that employ friction braking, produce particulate matter (dust) from the abrasion of braking friction materials. Dust produced from braking within a confined space can cause contamination of the operational environment, which can negatively affect other equipment and systems within the operational environment.

SUMMARY

Embodiments of brake assembly for a vehicle wheel are set forth below according to technologies and methodologies of the present disclosure. These brake assemblies are configured with a pump driven by rotation of the vehicle wheel. A working fluid provided to the pump has a selectively variable viscosity so that changing the viscosity of the working fluid changes the work done by the pump and, therefore, the braking force provided to the wheel.

A first representative embodiment of a brake assembly applies a braking force to a vehicle wheel that has a rim rotatably mounted to an axle. The brake assembly includes a housing fixedly positioned relative to the axle and a plurality of disks disposed within the housing and fixedly positioned relative to the rim. A fluid is disposed within the housing and has a selectively variable viscosity. The viscosity of the fluid is selectively increased to increase a braking force applied to the wheel.

A second representative embodiment of a brake assembly applies a braking force to a vehicle wheel that has a rim rotatably mounted to an axle. The brake assembly includes a housing and a plurality of disks rotatably mounted within the housing. The plurality of disks are operably coupled to the wheel so that rotation of the wheel rotates the disks The brake assembly further includes an electrorheological fluid disposed within the housing and having a selectively variable viscosity. In an embodiment, the viscosity of the electrorheological fluid is selectively increased to increase a braking force applied to the wheel.

In any embodiment, the housing comprises an inlet for receiving the fluid and an outlet for discharging the fluid.

In any embodiment, the brake assembly includes a heat exchanger receiving the fluid from the outlet and returning the fluid to the inlet, where the heat exchanger is configured to remove heat from the fluid.

In any embodiment, the housing and disks form part of a pump that drives the fluid through the housing.

In any embodiment, the fluid is an electrorheological fluid.

In any embodiment, the brake assembly includes a power source, the power source being configured to selectively provide an electrical field between at least two adjacent disks of the plurality of disks.

In any embodiment, the brake assembly includes the power source comprises a slip ring.

In any embodiment, the brake assembly includes the power source comprises a rotary air gap transformer.

In any embodiment, the brake assembly includes a power source, the power source being configured to provide an electrical field between at least two adjacent disks of the plurality of disks.

In any embodiment, the power source selectively varies an intensity of the electrical field to selectively control the apparent viscosity of the electrorheological fluid.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of the disclosed subject matter will become more readily appreciated as the same become better understood by reference to the following detailed description, when taken in conjunction with the accompanying drawings, wherein.

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Examples of an electrorheological brake for a vehicle are set forth below according to technologies and methodologies of the present disclosure. In an embodiment, the brake assembly uses a bladeless pump, also known as a "Tesla pump," that is driven by rotation of one or more of the wheels of the vehicle. In this regard, energy from the rotating wheel(s) is transferred to the fluid in the pump so that the pump provides a braking force that resists rotation of the wheels. In an embodiment, the working fluid in the pump is an electrorheological fluid, and the brake assembly is configured to selectively vary the resistance provided by the pump.

Figure 1:
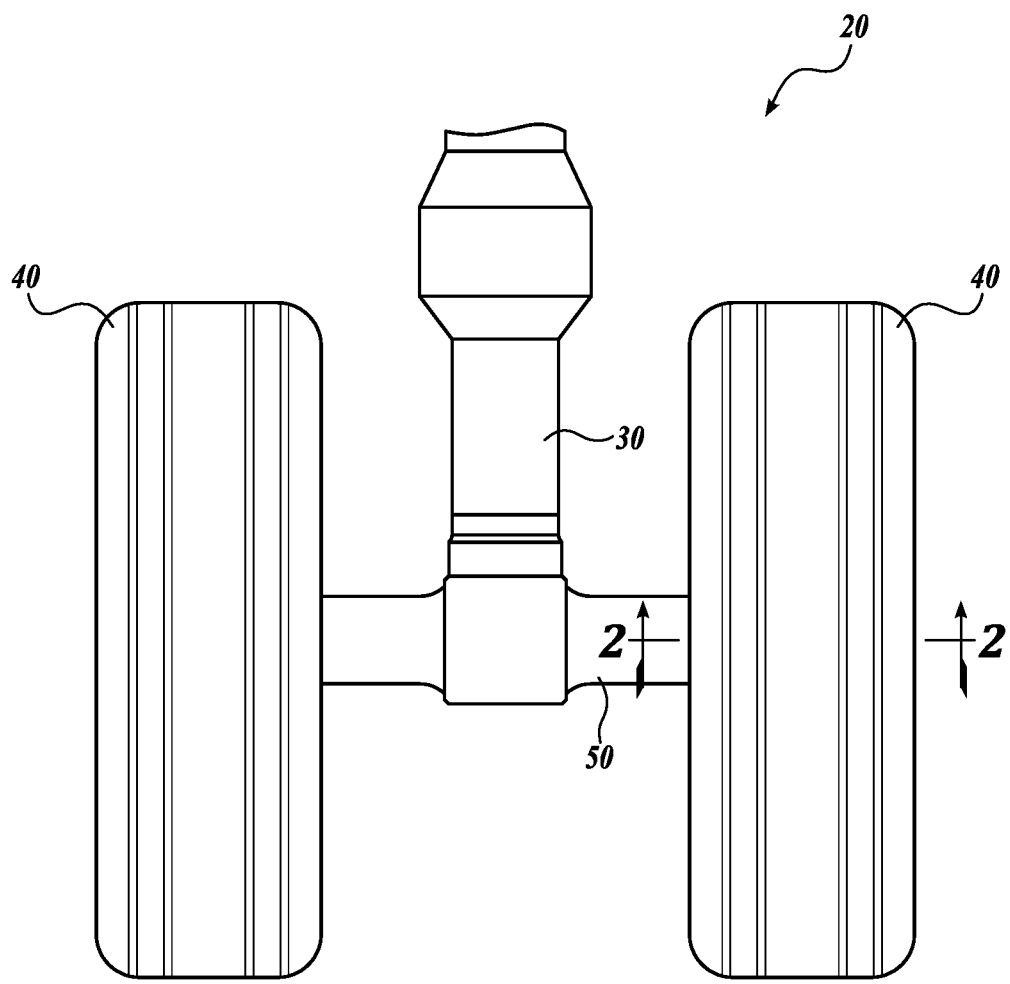
FIG. 1 shows a rear view of a landing gear system for a vehicle.
Figure 2:
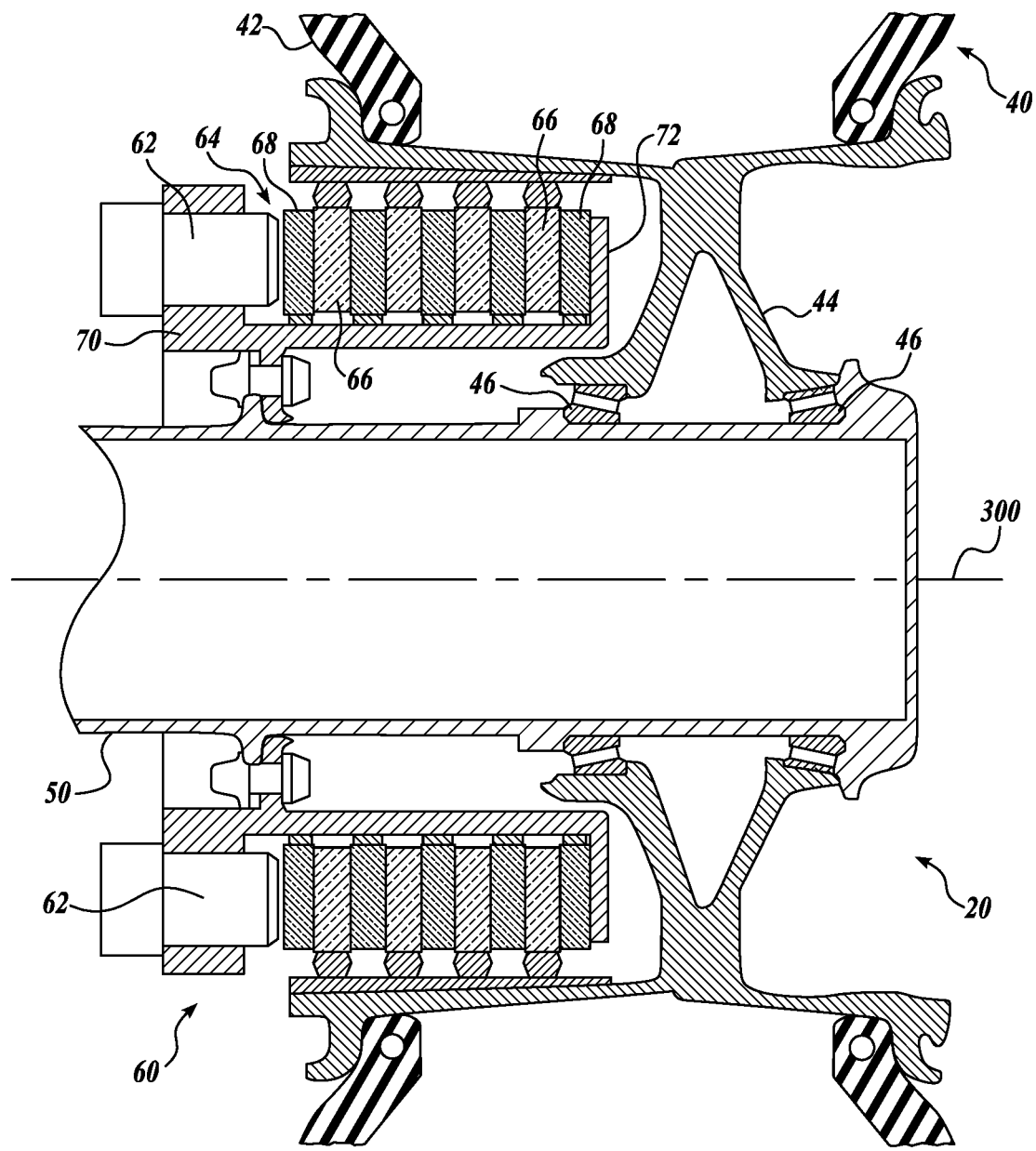
FIG. 2 shows a partial cross-sectional view thereof as indicated in FIG. 1, wherein the landing gear system includes a known brake assembly.
Figure 3:
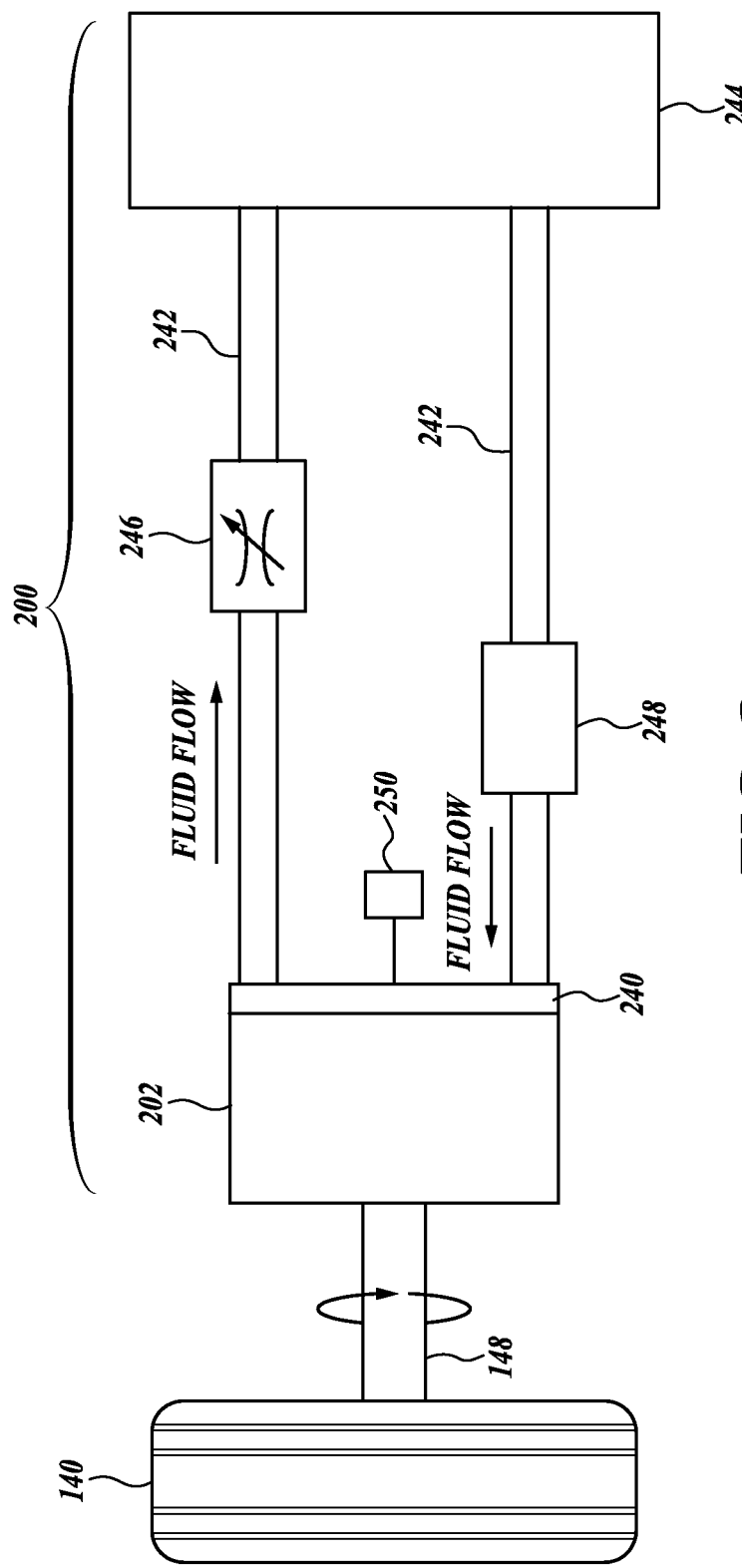
FIG. 3 shows a schematic diagram of a representative embodiment of a brake assembly according to the present disclosure.

FIG. 3 shows a schematic view of a representative embodiment of a brake assembly 200 according to aspects of the present disclosure. In the illustrated embodiment, the brake assembly 200 is coupled to a wheel 140 of a vehicle by a mechanical connection 148 so that a braking force generated by the brake assembly resists rotation of the wheel. In some embodiments, the brake assembly is coupled to more than one wheel 140. In some embodiments, the mechanical connection 148 includes a gearbox that increases the rotational speed of the pump relative to the speed of the wheel or wheels. In some embodiments, the brake assembly 200 is integrated within the cavity of the wheel 140.

The brake assembly 200 includes a pump 202 coupled to the mechanical connection 148 to receive rotational input generated by rotation of the wheel(s) 140. In the disclosed embodiment, the pump 202 is a bladeless pump, i.e., a Tesla pump, that utilizes rotational input from the wheel to generate a flow of a working fluid. The structure and configuration of an embodiment of a Tesla pump that can be practiced with embodiments of the present disclosure is described in U.S. Pat. No. 1,1061,142, issued to Nikola Tesla, the disclosure of which is incorporated by reference herein.

Still referring to FIG. 3, the flow of working fluid generated by the pump 202 is discharged through a first conduit 242 to a heat exchanger 244 and then returns to the pump through a second conduit 242. As the pump 202, driven by rotation of the wheel 140, generates a flow of the working fluid, the temperature of the working fluid increases. By passing the working fluid through the heat exchanger 244, heat is removed from working fluid so that the temperature of the working fluid is be maintained within acceptable operating limits. In some embodiments, the heat exchanger 244 is located in a position remote to the wheel 140.

As will be explained in further detail, the working fluid may be, for example, an electrorheological fluid. In general, an electrorheological fluid is a suspension composed of electrically polarizable particles dispersed in a dielectric fluid. The rheological properties of an electrorheological fluid vary with an electric field applied to the electrorheological fluid. In the present disclosure, an electrical supply 240 provides a selectively variable electric field that is applied to the working fluid. As the applied electric field increases, the apparent viscosity of the working fluid increases. Known electrorheological fluids are capable of reversibly increasing their apparent viscosity by several orders of magnitude within a matter of milliseconds. For the sake of simplicity, "viscosity" will be used interchangeably herein with "apparent viscosity" with the understanding that the viscosity of the electrorheological fluid is actually the apparent viscosity.

A controller 250 is operable connected to the electrical supply 240 to control the strength of the applied electrical field and, therefore, the apparent viscosity of the working fluid. As the apparent viscosity of the working fluid increases, the amount of resistance that within the pump increases, which results in higher braking forces. In some embodiments, the controller 250 controls the electrical supply in response to input from a vehicle operator or in response to predetermined operating conditions.

In some embodiments, the controller 250 is a discrete controller. In some embodiments, the described functions of the controller 250 are performed by one or more other control units of the vehicle. In some embodiments, discrete controller and/or the one or more other control units comprise hardware circuitry (e.g., analog and/or digital circuits, etc.) for carrying out its functionality described herein. In other embodiments, the controller or the various control units include, for example, a processor and memory. The memory may include computer readable storage media in read-only memory (ROM), random-access memory (RAM), and keep-alive memory (KAM), for example. The KAM may be used to store various operating variables or program instructions while the processor is powered down. The program instructions, when executed by the processor, is configured to carry out the functionality of the controller 250 described above. In that regard, the processor and/or memory storing the program instructions forms a special purpose controller specifically configured to carry out the methodologies and technologies described herein.

The computer-readable storage media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, instructions, programs, modules, etc.

As used herein, the term processor is not limited to integrated circuits referred to in the art as a computer, but broadly refers to a microcontroller, a microcomputer, a microprocessor, a programmable logic controller, an application specific integrated circuit, other programmable circuits, combinations of the above, among others. Therefore, as used herein, the term "processor" can be used to generally describe these aforementioned components, and can be either hardware or software, or combinations thereof, that implement logic for carrying out various aspects of the present disclosure. Similarly, the terms "module" and "unit" can include logic that may be implemented in either hardware or software, or combinations thereof.

Still referring to FIG. 3, in some embodiments, the brake assembly 200 includes a restrictor 246 that selectively restricts flow of the working fluid through one of the conduits 242. In the event that an increased apparent viscosity of the working fluid does not provide sufficient resistance in the pump 202, the restrictor 246 restricts flow of the working fluid through the pump, which increases resistance in the pump, and therefore, the resulting braking force. In some embodiments, the restrictor 246 is a known fixed-orifice restrictor having, for example, one or more holes drilled in a fitting to limit the flow of working fluid through the fitting. In some embodiments, the restrictor is a known variable orifice restrictor having, for example, one or more calibrated needle valves that selectively restrict the flow of working fluid through the valve(s). In some embodiments, the restrictor could be an electrorheological restrictor, controlled in parallel with the brake. (effectively a number of plates or even an orifice but with means to charge the fluid and vary the viscosity). In some embodiments, the brake assembly 200 includes one or more boost pumps 248 that ensure that sufficient working fluid is provided to the pump 202.

Figure 4:
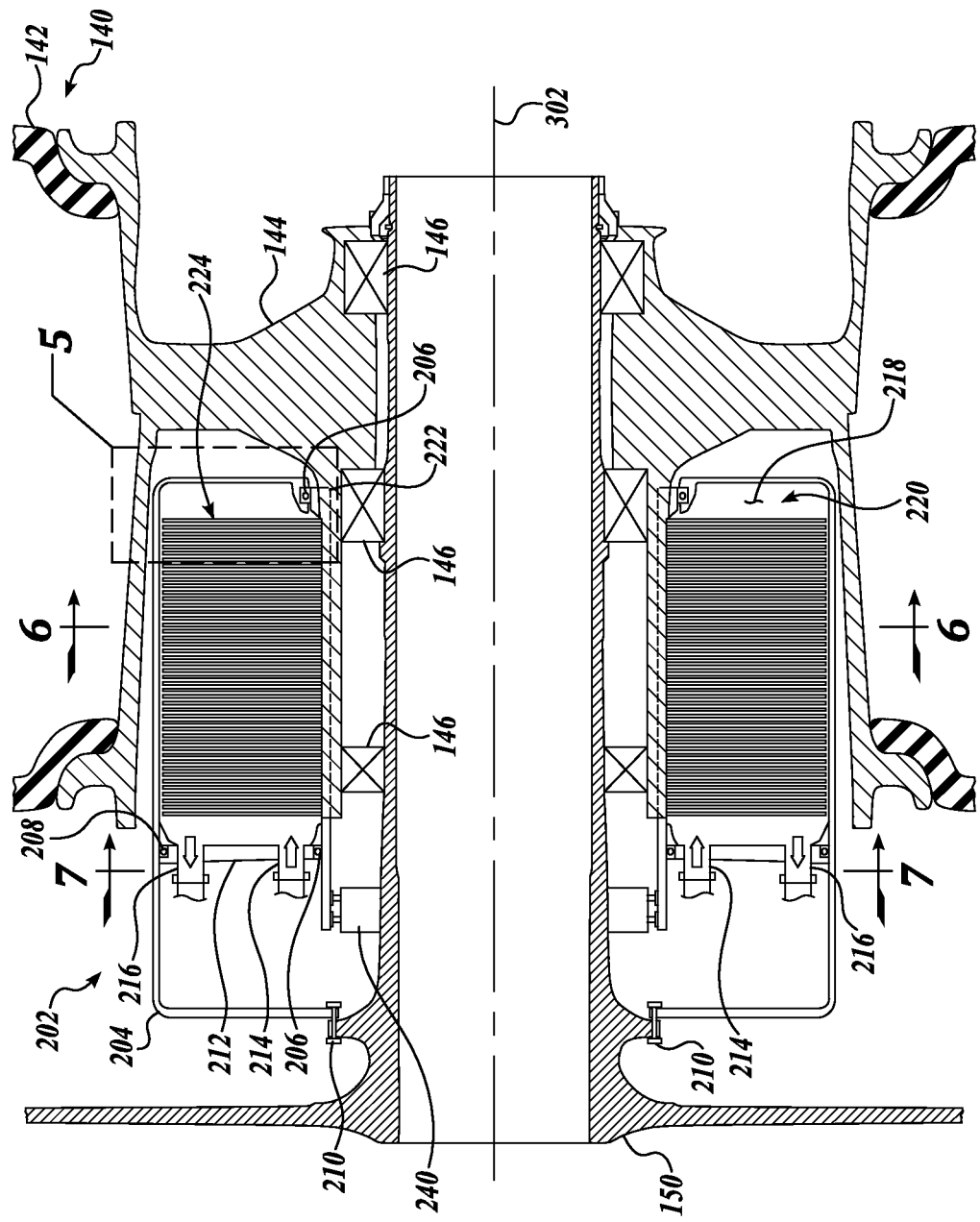
FIG. 4 shows a partial cross-sectional view of thereof.
Figure 5:
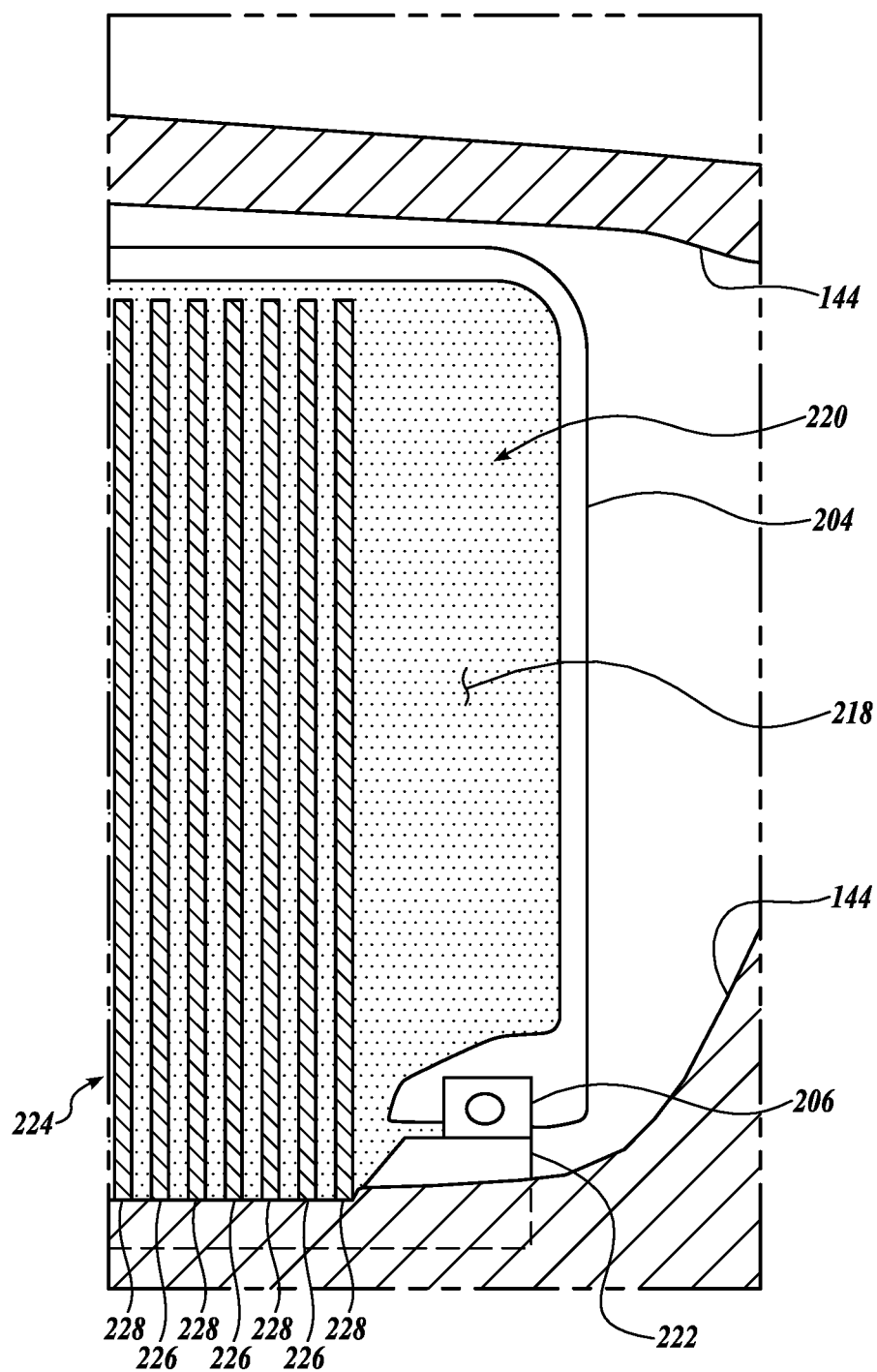
FIG. 5 shows an enlarged portion of the cross-sectional view of FIG. 4.
Figure 6:
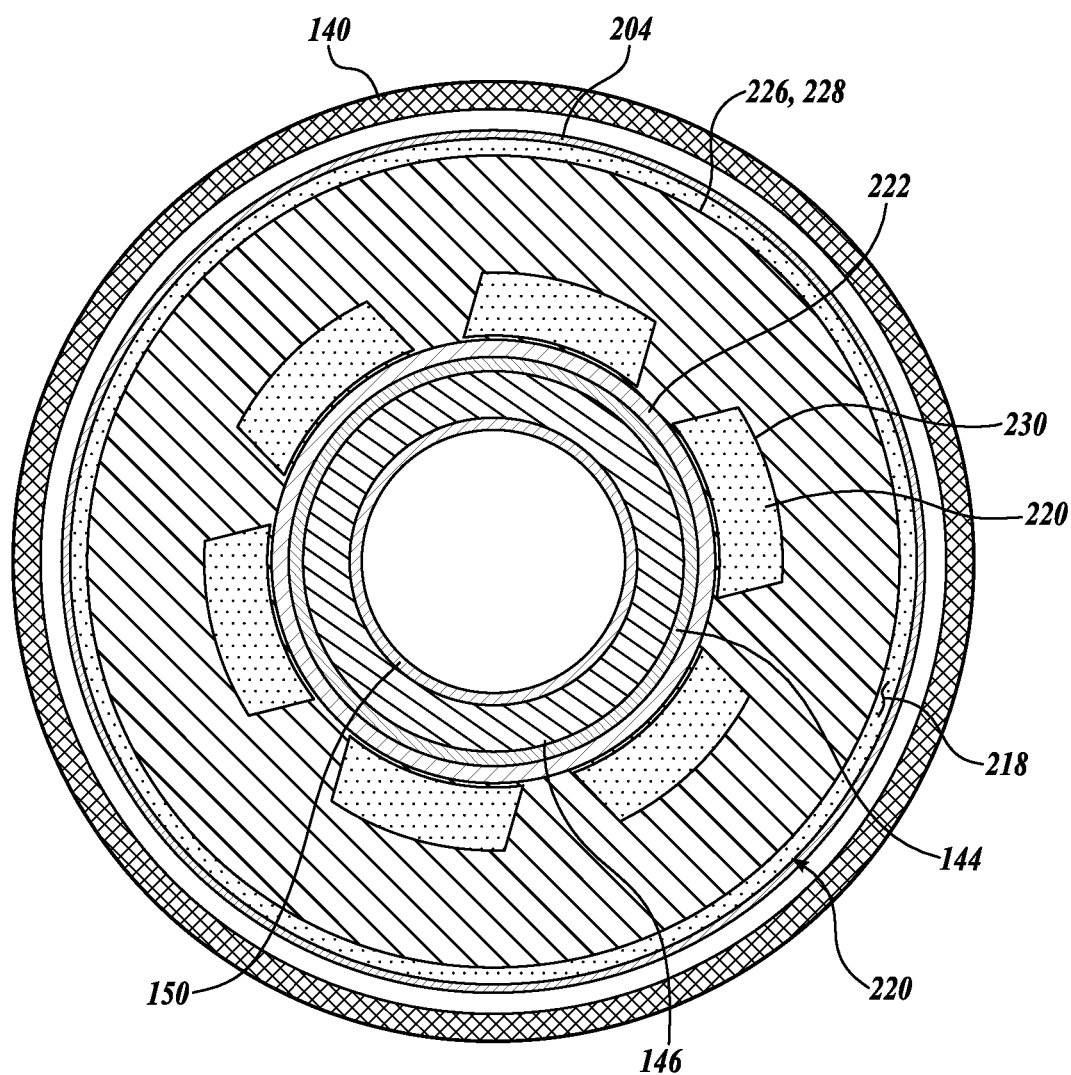
FIG. 6 shows a cross-sectional view as indicated in FIG. 4.

Referring now to FIGS. 4-6, an embodiment of a brake assembly 200 is shown. The brake assembly 200 is mounted to a wheel 140 that has a pneumatic tire 142 mounted to a rim 144. The rim 144 is mounted to an axle 150 by a plurality of bearings 146 so that the wheel 140 is rotatable relative to the axle about an axis 302.

As best shown in FIGS. 4 and 5, the brake assembly 200 includes an annular rotor 222 fixedly coupled to the rim 144 by a plurality of splines (not shown), so that the rotor rotates about axis 302 with the wheel 140. A housing 204 is mounted to the axle 150 at one end by a plurality of fasteners 210. A second end of the housing 204 sealingly engages a portion of the rotor 222 with a dynamic seal 206. That is, the housing 204, which is fixedly positioned relative to the axle 150, maintains sealing engagement with the rotor 222 as the rotor rotates about axis 302 with the wheel 140.

An annular end plate 212 is fixedly positioned relative to the housing 204. An outer edge of the end plate 212 maintains sealing engagement with the housing by means of a seal 208, and an inner edge of the end plate maintains sealing engagement with the rotor 222 by means of a dynamic seal 206. One or more inlet ports 214 are formed in the end plate 212 proximate to the inner edge of the end plate, and one or more outlet ports 216 are formed in the end plate proximate to the outer edge of the end plate.

The housing 204, rotor 222, and end plate 212 cooperate to define a fluid-tight cavity 218 (except for the inlet ports 214 and outlet ports 216). The seals 206 and 208 maintain the fluid-tight nature of the cavity, even as the rotor 222 rotates with the wheel relative to the housing 204 and the endplate 212. It will be appreciated that the illustrated embodiment is exemplary only, and other configurations are possible. In this regard, other suitable configurations are contemplated to provide a fluid-tight cavity with some portions that are fixed relative to the axle and other portions that rotate with the wheel, and such configurations should be considered within the scope of the present disclosure.

As shown in FIGS. 4-6, a disk stack 224 includes a plurality of parallel disks 226 and 228 coupled to the rotor 222. Accordingly, the disks 226 and 228 rotate with the rotor 222 and, therefore, the wheel 140 about axis 302 when wheel rotates. As best shown in FIG. 6, a plurality of apertures 230 are formed in each disk 226 and 228 to provide improved fluid communication between the areas on opposite side of a given disk.

With the cavity 218 filled with a working fluid, the housing 204, rotor 222, and end plate 212 cooperate with the disk stack 224 for functioning as pump 202 and, more specifically, a bladeless pump. Rotation of the disk stack 224 by the wheel 140 drives working fluid received by the inlet ports 214 through the cavity 218 and out the outlet ports 216. The working fluid being driven through the pump 202 provides resistance to the rotation of the disk stack 224, which is in turn provided to the wheel 140 as a braking force.

In some embodiments, the working fluid is an electrorheological fluid 220 with a variable viscosity that is selectively increased and decreased to control the braking force provided to the wheel 140. In this regard, each disk 226 and 228 is electrically conductive and electrically coupled to an electrical supply 240. The electrical supply 240 provides different charges to adjacent disks 226 and 228 to create an electric field across the space between the discs. Referring to FIG. 5, disks 226 have a first charge, and disks 228 have a second charge different from the first charge. In some embodiments, the electrical supply 240 provides a DC current so that disks 226 have a positive charge, and disks 228 have a negative charge or are grounded. By selectively controlling the difference in the charges between adjacent disks, the intensity of the electric field between the disks is controlled.

In the illustrated embodiment, the electrical supply 240 is fixedly positioned relative to the axle 150. In some embodiments, the electrical supply 240 includes a slip ring to transfer an electrical charge to the rotating disks 226 and 228. In some embodiments, a rotary transformer transfers electric excitation to the disks across a gap between the electrical supply 240 and the rotating disks 226 and 228. In some embodiments, a rectifier converts AC current output by the rotary transformer into DC current. It will be appreciated that any suitable configuration for providing electric excitation wherein the polarity varies between adjacent rotating disks can be included, and such configurations should be considered within the scope of the present disclosure.

Still referring to FIGS. 4-6, the cavity 218 is filled with an electrorheological fluid 220, including the spaces between the disks 226 and 228. In some embodiments, the electrorheological fluid 220 is a dielectric liquid with particles suspended therein. In some embodiments the dielectric liquid is a silicone-based liquid capable of withstanding high operating temperatures associated with vehicle brake systems. When there is no electrical charge between adjacent disks 226 and 228, the electrorheological fluid 220 has a low apparent viscosity. In some embodiments, the electrorheological fluid 220 acts as a lubricant when there is no electrical charge between adjacent disks 226 and 228.

Figure 7:
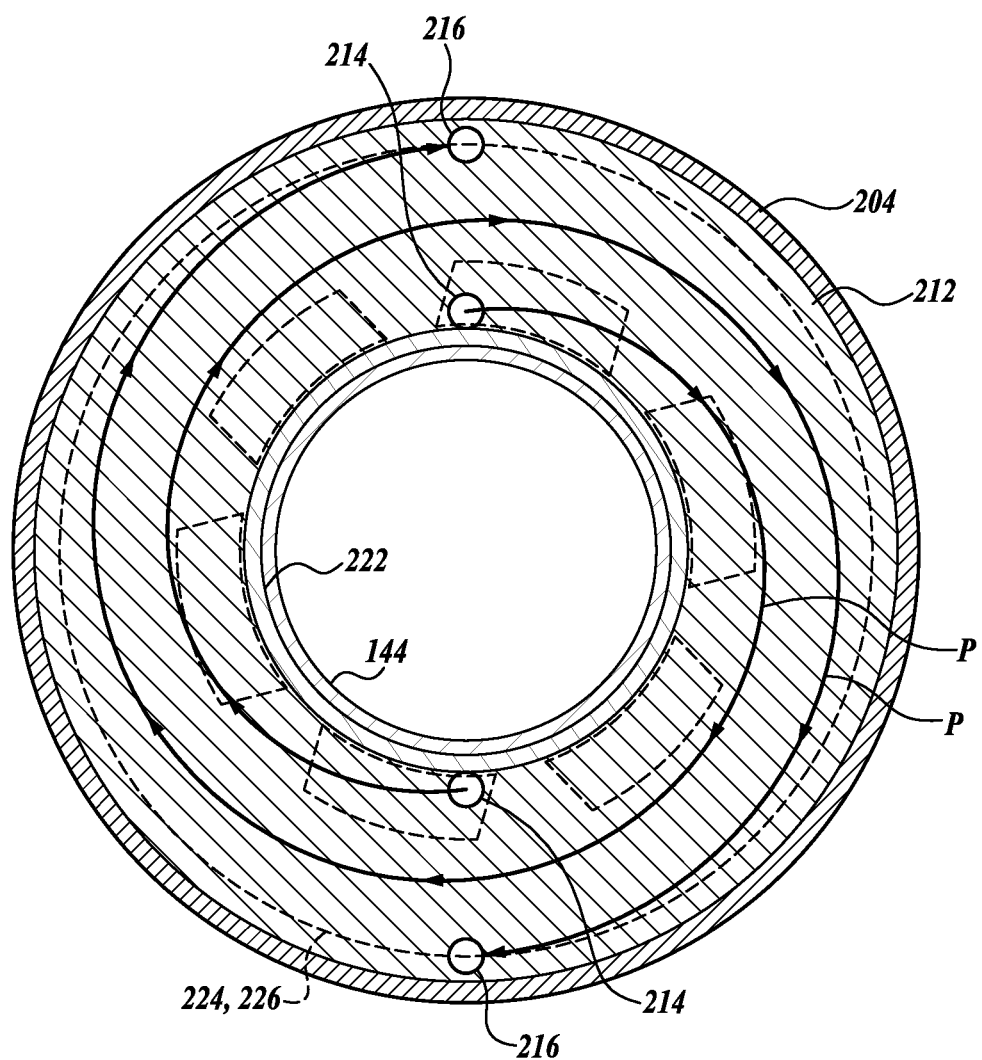
FIG. 7 shows a flow of fluid through the brake assembly shown in FIG. 6.

Referring now to FIG. 7, the working fluid is provided to the pump 202. More specifically, the electrorheological fluid 220 enters the cavity 218 of the pump 202 through the one or more inlet ports 214 formed in the end plate 212. The disks 226 and 228 are immersed in the electrorheological fluid 220 so that rotation of the disks with the wheel 140 transfers energy from the rotating disks and by extension, the rotating wheel 140, to the fluid. In this regard, the rotating disks 226 and 228 accelerate the electrorheological fluid radially outward along a path P until the fluid exits the cavity of the pump 202 through the outlet ports 216. Rotation of the disks 226 and 228 within the fluid also heats the fluid. The fluid 220 leaving the outlet ports 216 is then returned to the inlet ports 214. In the embodiment shown in FIG. 3, the working fluid from the outlet ports 216 is directed through a conduit 242 through a heat exchanger 244 and is returned to the inlet ports 214 by another conduit after being cooled by the heat exchanger.

In operation, the retardant forces provided by the brake assembly 200 are controlled by varying the intensity of the electric field between the disks 226 and 228. When no braking force is desired, the electrical supply 240 does not produce an electric field between the disks 226 and 228, and the electrorheological fluid 220 has a low apparent viscosity. In this state, minimal energy is transferred from the rotating disks 226 and 228 to the fluid 220. When a braking force is desired, the electrical supply 240 produces an electric field between the disks 226 and 228, which increases the apparent viscosity of the electrorheological fluid 220. The higher apparent viscosity increases the energy transferred from the rotating disks 226 and 228 to the electrorheological fluid 220, thereby increasing the resistive braking force applied to the wheel 140. This braking force can be increased or decreased as needed by increasing and decreasing, respectively, the intensity of the electrical field between the disks 226 and 228.

The present application may reference quantities and numbers. Unless specifically stated, such quantities and numbers are not to be considered restrictive, but exemplary of the possible quantities or numbers associated with the present application. In this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A brake assembly for a vehicle wheel, the wheel comprising a rim rotatably mounted to an axle, the brake assembly comprising:
   a housing fixedly positioned relative to the axle;
   a plurality of disks disposed within the housing and fixedly positioned relative to the rim, one or more disks of the plurality of disks having at least one aperture extending therethrough in an axial direction and being configured to provide a fluid path through the aperture; and
   a fluid disposed within the housing and having a selectively variable viscosity, wherein the viscosity of the fluid is selectively increased to increase a braking force applied to the wheel.

2. The brake assembly of claim 1, wherein the housing comprises an inlet for receiving the fluid and an outlet for discharging the fluid, wherein the inlet is located proximal to the axle, and the outlet is located radially outward from the inlet.

3. The brake assembly of claim 2, further comprising a heat exchanger receiving the fluid from the outlet and providing fluid to the inlet, where the heat exchanger is configured to remove heat from the fluid.

4. The brake assembly of claim 2, wherein the housing and disks form part of a pump that drives the fluid through the housing.

5. The brake assembly of claim 1, wherein the fluid is an electrorheological fluid.

6. The brake assembly of claim 5, further comprising a power source, the power source being configured to selectively provide an electrical field between at least two adjacent disks of the plurality of disks.

7. The brake assembly of claim 6, wherein the power source comprises a slip ring.

8. The brake assembly of claim 6, wherein the power source comprises a rotary air gap transformer.

9. A brake assembly for a vehicle wheel, the wheel comprising a rim rotatably mounted to an axle, the brake assembly comprising:
   a housing;
   a plurality of disks rotatably mounted within the housing, the plurality of disks being operably coupled to the wheel so that rotation of the wheel rotates the disks, one or more disks of the plurality of disks having at least one aperture extending therethrough in an axial direction and being configured to provide a fluid path through the aperture; and
   an electrorheological fluid disposed within the housing and having a selectively variable viscosity, wherein the viscosity of the electrorheological fluid is selectively increased to increase a braking force applied to the wheel.

10. The brake assembly of claim 9, further comprising a power source, the power source being configured to selectively provide an electrical field between at least two adjacent disks of the plurality of disks.

11. The brake assembly of claim 10, wherein the power source selectively varies an intensity of the electrical field to selectively control the apparent viscosity of the electrorheological fluid.

12. The brake assembly of claim 1, wherein each of the one or more disks of the plurality of disks further includes additional apertures arranged circumferentially around the axis, each of the additional apertures extending therethrough in an axial direction and being configured to provide a fluid path through the aperture.

13. The brake assembly of claim 1, wherein each disk of the plurality of disks has at least one aperture extending therethrough in an axial direction and being configured to provide a fluid path through the aperture.

14. The brake assembly of claim 13, wherein each disk of the plurality of disks further includes additional apertures arranged circumferentially around the axis, each of the additional apertures extending therethrough in an axial direction and being configured to provide a fluid path through the aperture.

* * * * *